(12) United States Patent
Irwin

(10) Patent No.: US 11,527,909 B2
(45) Date of Patent: Dec. 13, 2022

(54) MAGNETIC CHARGING DEVICE

(71) Applicant: Kelly Irwin, Rogers, AR (US)

(72) Inventor: Kelly Irwin, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 858 days.

(21) Appl. No.: 16/409,513

(22) Filed: May 10, 2019

(65) Prior Publication Data

US 2019/0348856 A1 Nov. 14, 2019

Related U.S. Application Data

(60) Provisional application No. 62/670,593, filed on May 11, 2018.

(51) Int. Cl.
 *H02J 7/12* (2006.01)
 *B62B 5/00* (2006.01)
 *H02J 7/00* (2006.01)

(52) U.S. Cl.
 CPC .............. *H02J 7/12* (2013.01); *B62B 5/0056* (2013.01); *H02J 7/0042* (2013.01)

(58) Field of Classification Search
 CPC .......... H02J 7/12; H02J 7/0042; B62B 5/0056
 USPC ....................................................... 320/111
 See application file for complete search history.

(56) References Cited

U.S. PATENT DOCUMENTS

| | | |
|---|---|---|
| 3,363,215 A | 1/1968 | Smith |
| 3,808,577 A | 4/1974 | Mathauser |
| 7,127,623 B2 | 10/2006 | Potega |
| 7,311,526 B2 | 12/2007 | Rohrbach et al. |
| 7,356,715 B2 | 4/2008 | Okayasu |
| 7,641,476 B2 | 1/2010 | Didur et al. |
| 7,711,870 B2 | 5/2010 | Yoshida et al. |
| 3,063,512 A1 | 11/2011 | Chen et al. |
| 8,072,725 B2 | 12/2011 | Kosaki et al. |
| 8,435,041 B2 | 5/2013 | Holland |
| 8,596,881 B2 | 12/2013 | Umeno |
| 8,622,629 B1 | 1/2014 | Umeno |
| 9,124,104 B2 | 9/2015 | Niemann et al. |
| 9,153,986 B1 | 10/2015 | Herr et al. |
| 9,197,010 B2 | 11/2015 | Greig et al. |
| 9,209,547 B2 | 12/2015 | Lozano Villarreal et al. |
| 9,225,126 B2 | 12/2015 | Jantada et al. |
| 9,225,183 B2 | 12/2015 | King |
| 9,281,612 B2 | 3/2016 | Gao et al. |
| 9,300,083 B2 | 3/2016 | Bosscher et al. |
| 9,306,328 B2 | 4/2016 | Umeno |
| 9,312,632 B2 | 4/2016 | Colantuono et al. |

(Continued)

FOREIGN PATENT DOCUMENTS

WO PCT/CN2016/079134 1/2017
WO PCT/FR2016/051691 1/2017

(Continued)

*Primary Examiner* — Suchin Parihar
(74) *Attorney, Agent, or Firm* — Boyd D. Cox

(57) ABSTRACT

A magnetic charging device for charging the battery batteries of an electric motorized cart has a plug unit a a charger unit. When the battery or batteries are charging, the plug unit and charger unit are releasably engaged with each other by a magnetic connection. A microprocessor controller provides a safety feature that ensures the plug unit is fully engaged with the charger unit before electricity is allowed to flow from the power source to the batteries.

7 Claims, 4 Drawing Sheets

(56) References Cited

U.S. PATENT DOCUMENTS

| | | |
|---|---|---|
| 9,312,634 B2 | 4/2016 | Fullerton et al. |
| 9,520,225 B2 | 12/2016 | Waffenschmidt et al. |
| 9,531,118 B2 | 12/2016 | Byrne et al. |
| 9,559,545 B2 | 1/2017 | Liu et al. |
| 9,577,440 B2 | 2/2017 | Partovi et al. |
| 9,583,871 B1 | 2/2017 | Rudisill et al. |
| 9,602,016 B2 | 3/2017 | Freeman et al. |
| 9,620,886 B1 | 4/2017 | Spangler |
| 9,620,893 B2 | 4/2017 | Kim et al. |
| 9,634,428 B2 | 4/2017 | DiFonzo et al. |
| 9,634,474 B2 | 4/2017 | Goodson |
| 9,653,860 B2 | 5/2017 | Hestrin |
| 9,653,942 B2 | 5/2017 | Kim et al. |
| 9,660,376 B2 | 5/2017 | Gao et al. |
| 9,660,377 B2 | 5/2017 | Greig et al. |
| 9,660,378 B2 | 5/2017 | Silvers et al. |
| 9,673,636 B2 | 6/2017 | Yoda et al. |
| 9,685,733 B2 | 6/2017 | Zhao et al. |
| 9,685,742 B2 | 6/2017 | Liu et al. |
| 9,698,524 B1 | 7/2017 | Morgan et al. |
| 9,698,607 B2 | 7/2017 | Kesler et al. |
| 9,718,374 B2 | 8/2017 | Tang et al. |
| 9,722,492 B2 | 8/2017 | Levesque et al. |
| 9,722,502 B2 | 8/2017 | Steimer |
| 9,728,959 B2 | 8/2017 | Kokkonen |
| 9,729,059 B1 | 8/2017 | Parto |
| 9,729,060 B2 | 8/2017 | Osanai et al. |
| 9,729,080 B2 | 8/2017 | Maeda |
| 9,729,083 B2 | 8/2017 | Takaki |
| 9,729,162 B1 | 8/2017 | Yu et al. |
| 9,733,282 B2 | 8/2017 | Schrom et al. |
| 9,735,697 B2 | 8/2017 | Sakakibara |
| 9,736,894 B2 | 8/2017 | Summerland |
| 9,738,165 B2 | 8/2017 | Rosendahl |
| 9,739,821 B2 | 8/2017 | Krumpholz et al. |
| 9,741,517 B2 | 8/2017 | Aratani |
| 9,742,199 B2 | 8/2017 | Abe |
| 9,742,214 B2 | 8/2017 | Ha et al. |
| 9,774,149 B2 | 9/2017 | Janfada et al. |
| 9,898,098 B2 | 2/2018 | Immel et al. |
| 2010/0207771 A1* | 8/2010 | Trigiani .......... H02J 50/80 320/108 |
| 2014/0120746 A1 | 5/2014 | Persion et al. |
| 2015/0375621 A1* | 12/2015 | Ono .......... B60L 55/00 307/10.1 |
| 2016/0097525 A1* | 4/2016 | Chien .......... H02J 7/00 362/135 |
| 2017/0093104 A1 | 3/2017 | Powers et al. |
| 2017/0187146 A1 | 6/2017 | Kiani et al. |
| 2019/0348848 A1* | 11/2019 | Segnit .......... H02J 7/0013 |

FOREIGN PATENT DOCUMENTS

| | | |
|---|---|---|
| WO | PCT/FR2016/052166 | 3/2017 |
| WO | PCT/US2016/016016 | 6/2017 |

\* cited by examiner

MAGNETIC CHARGING DEVICE

BACKGROUND

The present invention is directed to a magnetic charging device that is generally used to charge electric motorized carts. The magnetic charging device includes a charger unit and a plug unit that is attached to a chargeable motorized cart. The plug unit has a polarized plug that is adapted to magnetically connect with a plug receptacle on the charger unit. The plug unit conveys electricity to the cart from the charger unit in order to charge the cart's battery or batteries.

Motorized electric carts are commonly used at retail stores, wherein the batteries of each cart need to be regularly charged in order to provide power to run the cart. Typically, the battery charger for a motorized cart is plugged into a 120 v AC outlet whereby the 120 v alternating current (AC) is converted into direct current (DC) for charging the battery or batteries that power the cart. When the battery is charged, the cart is ready for use and the charger's plug is removed from the power outlet.

Often the plug is improperly removed from the outlet by yanking on the cord rather than by directly grasping the plug for removal. Fulling on the cord to detach the charger's plug from the outlet can result in damage to the cord and to the plug. This can especially be the case with standard connections where the plug is frictionally engaged within the outlet. Such damage requires that repairs Lo the cord and/or plug be made. Making repairs can result in repair down time for the cart as well as unwanted maintenance costs. In some cases, such damage may create hazards that are dangerous to personnel, customers, and property.

Additionally, the magnetic charging device of the present invention includes a microprocessor controller that acts as a safety mechanism. The microprocessor controller recognizes when the polarized plug is fully engaged with the plug receptacle of the charger unit, thereby allowing electricity to flew from the charger unit to the plug unit to charge the batteries. However, the charger unit is blocked from releasing electricity until the polarized plug is fully engaged with the plug receptacle of the charger unit, thereby avoiding the creation of an unwanted electrical connection. The polarized plug and the cooperating plug receptacle are polarized and can only be connected in one orientation. This polarized cooperation protects the magnetic charging device by preventing a reverse polarity connection between the charger unit and the plug unit.

A standard plug on an electric cart's battery charger generally fits snugly into the receptacle of a standard 120 v AC outlet. When the plug is pulled out using the cord, as is frequently the case, the cord and/or plug can be damaged. There is a need for a magnetic charging device for an electric motorized cart that has a safe, easily releasable connection between the cart and the power source in which the plug can be readily removed from the power outlet without causing undue damage to the cord or plug.

Therefore, the magnetic charging device of the instant invention provides a plug unit that magnetically connects to the charger unit and that can be readily released from the charger unit by using only a minimal amount of force necessary to overcome the magnetic connection. In addition, the charger unit includes a microprocessor controller that recognizes when the feedback, loop plug contacts on the plug unit are fully engaged with the feedback loop charger contacts of the plug receptacle of the charger unit before allowing electricity to be supplied to the electrical contacts of the plug receptacle.

SUMMARY

The present invention is related to a magnetic charging device that is used to charge the battery or batteries of an electric motorized cart. The magnetic charging device includes a charger unit and a plug unit that is magnetically connected to the charger unit during the charging process.

It is an object of the present invention to provide a magnetic charging device for charging the battery of an electric motorized cart.

It is a further object of the present invention to provide a magnetic charging device for converting alternating current to direct current in order to charge a motorized vehicle battery.

It is a further object of the present invention to provide a magnetic charging device having a charger unit that is readily releasable from a cooperating plug unit that is associated with an electric motorized cart.

It is a further object of the present invention to provide a magnetic charging device having a charger unit that releasably connects to a power source and a cooperating plug unit for charging a battery.

It is a further object of the present invention to provide a charging device for an electric vehicle having a magnetic connection between a plug and a plug receptacle.

It is a further object of the present invention to provide a magnetic charging device with a polarized plug made of a magnetized material and a charger unit having a plug receptacle made of a magnetic material for receiving the polarized plug.

It is a further object of the present invention to provide a charging device with a microprocessor controller that recognizes when the plug is fully engaged with the charger unit in order to allow power to flow from the power source to the battery.

It is a further object of the present invention to provide a charging device with a microprocessor controller that recognizes when the plug is not fully engaged with the charger unit in order to block power from flowing from the power source to the battery.

It is a further object of the present, invention to provide a magnetic charging device that deters a reverse polarity connection between the plug unit and the charger unit.

BRIEF DESCRIPTION OF THE DRAWINGS

Reference is made to the accompanying drawings in which are shewn illustrative embodiments of the present invention and from which novel features and advantages will be apparent.

DETAILED DESCRIPTION

Figure 1:
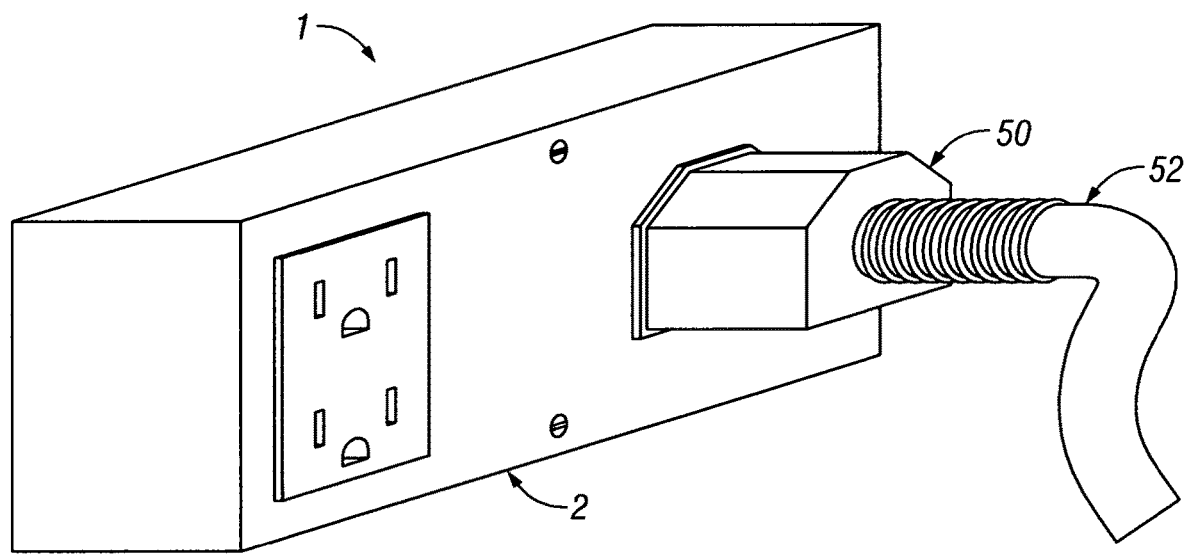
FIG. 1 is a perspective view of the magnetic charging device of the present invention.

The present invention shown in FIGS. 1-5 is drawn to a magnetic charging device (1) that is used to charge an electric motorized cart. The magnetic charging device (1) includes a charger unit (2) and a plug unit (50).

The charger unit (2) has an AC/DC charger (3), a plug receptacle (5), and a pass-through alternating current (AC) outlet (4).

Figure 2:
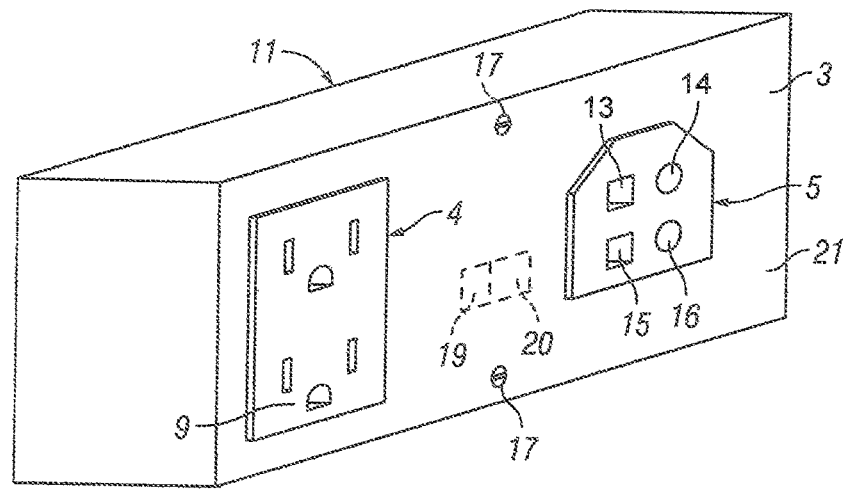
FIG. 2 is a perspective view of the front side of the charger unit of the magnetic charging device of FIG. 1.
Figure 5:
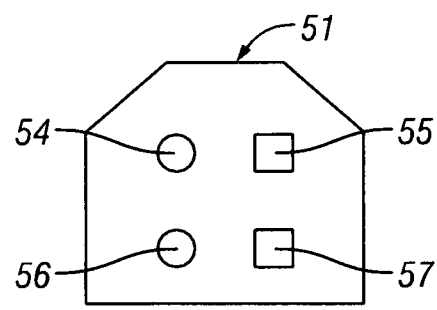
FIG. 5 is a plan view of the polarized plug on the plug unit of the magnetic charging device of FIG. 1.

The plug receptacle (5) has a pair of electrical charger contacts and a pair of feedback loop charger contacts as shown in FIGS. 2 and 5. Of the electrical charger contacts, one is a positive contact (14) and the other is a negative contact (13). Regarding the two feedback loop charger contacts, one is a first loop charger contact (15) and the other is a second loop charger contact (16).

The charger unit (2) further includes means for releasably attaching the charger unit to an electrical outlet. The means for releasably attaching the charger unit is an electrical coupler (10), a plurality of apertures (18) and a plurality of threaded fastener(17). The electrical coupler (10) engages the charger unit (2) with a conventional electrical outlet. The apertures (18) are disposed on the AC/DC charger (3) to align with the apertures of a conventional electric box. The threaded fasteners (17) extend through the apertures and attach to the conventional electric box to further secure the charger unit (2) to the power source. It is preferred that the electrical outlet for providing power to the magnetic charging device (1) is a 120 v AC outlet.

A microprocessor controller (19) is comprised by the charger unit (2). The microprocessor controller (ISO includes a charger circuit (20).

The plug unit (50) includes a polarized plug (51) and a cord (52). The polarized plug (51) further includes a plug circuit (53), positive (54) and negative (55) electrical plug contacts, and first (56) and second (57) feedback loop plug contacts.

The polarized plug (51) of the plug unit (50) comprises a magnetized material having properties of magnetism, while the plug receptacle (5) of the charger unit (2) comprises a magnetic material. The magnetized material of the polarized plug (51) attracts the magnetic material of the plug receptacle (5) to create a magnetic connection between the plug unit (50) and the charger unit (2). The force of the magnetic connection holds the plug (51) within the plug receptacle (5) when the plug (51) and receptacle (5) are engaged with each other.

Consequently, the polarized plug (51) is held within the plug receptacle (5) by magnetic force. To remove the polarized plug (51) from the plug receptacle (5), a separating force strong enough to overcome the magnetic attraction between the plug (51) and receptacle (5) is required. Such a separating force is small enough to deter damage to the cord and plug when removing the plug from the plug receptacle.

The charger unit (2) connects to an electrical power source and converts the alternating current to direct current in order to charge the cart's batteries. Specifically, the AC/DC charger (3) converts alternating current to direct current for charging.

The cord (52) of the plug unit (50) is connected to the motorized cart. Electricity from the power source is conveyed through the cord (52) to the cart's battery or batteries when charging. The polarized plug (1) is shaped to fit within the plug receptacle (5) of the charger unit (2) in only one orientation. This fitting creates a polarized connection between the plug unit (3) and the charger unit (2) to prevent a reverse polarity connection being made between the units (3, 2).

The microprocessor controller (19) of the charger unit (2) controls the flow of electricity between the charger unit (2) and the plug unit (50). The microprocessor controller (19) detects if the feedback loop plug contacts (56, 57) on the polarized plug (51) are in contact with the feedback loop charger contacts (15, 16) on the plug receptacle (5). Preferably, the feedback loop created by the joinder of the feedback loop charger contacts (15, 16) and feedback loop plug contacts (56, 57) comprises a fail safe feature which produces a value that can readily be recognized by the microprocessor controller (19), such as a certain level of resistance or other measurable characteristic. When the feedback loop plug contacts (56, 57) of the polarized plug (51) are in contact with the feedback loop charger contacts (15, 16) of the plug receptacle (5) and the required value is recognized and confirmed by the microprocessor controller (19), electricity is allowed to flow from the power source to the electrical charger contacts (13, 14) of the plug receptacle (5), for charging of the cart. When the microprocessor controller (19) does not recognize the feedback loop plug contacts (56, 57) of the plug unit (50) to be in contact with the feedback loop charger contacts (15, 16) of the charger unit (2) due to the absence of the required value, the flow of electricity to the electrical charger contacts (13, 14) of the plug receptacle (5) is blocked. By controlling the flow of electricity so that it flows only when full contact is made between the plug receptacle (5) and the polarized plug (51), unwanted, potentially dangerous, exposure can be avoided.

The plug unit (50) is releasably attached to the charger unit (2) when the magnetic charging device (1) is in use. The polarized plug (51) is inserted into the plug receptacle (5) of the charger unit (2) and held therein by the magnetic connection between the polarized plug (51) and the plug receptacle (5). When not in use, the polarized plug (51) can be easily withdrawn from the plug receptacle (5).

The cord (52) extends between the polarized plug (51) and an electric motorized vehicle.

When attaching the charger unit (2) to a conventional electrical outlet, the apertures that are used to attach a face plate to the electrical cutlet can be used instead to attach the charger unit (2) to the electrical outlet.

Figure 3:
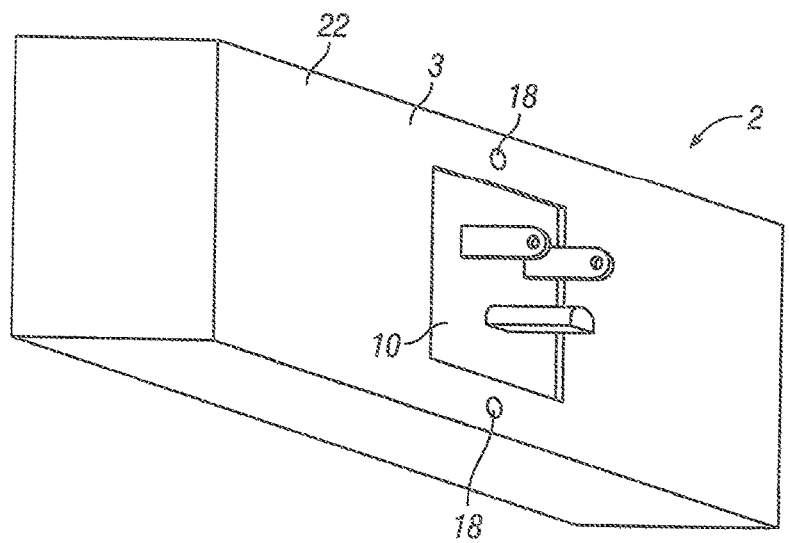
FIG. 3 is a perspective view of the rear side of the charger unit of the magnetic charging device of FIG. 1.
Figure 4:
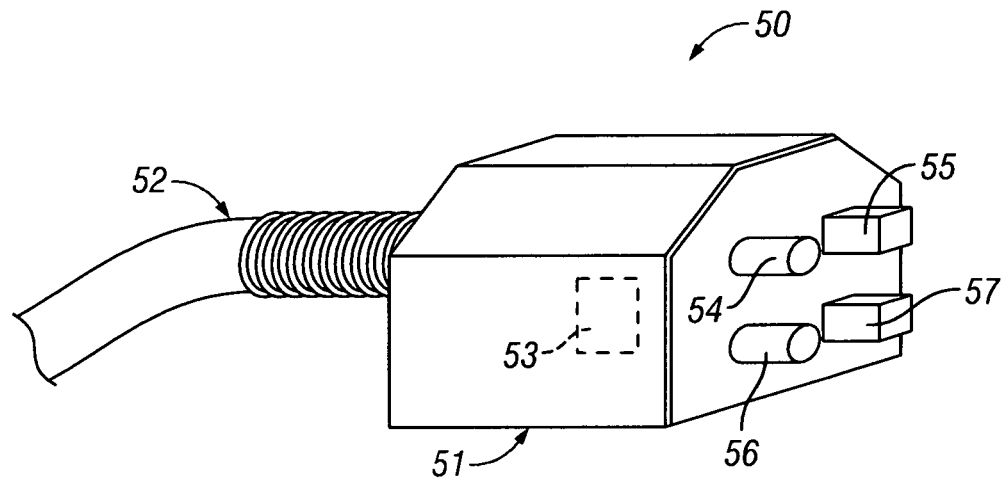
FIG. 4 is a perspective view of the polarized plug of the magnetic charging device shown FIG. 1.

The charger unit (2) also comprises an AC/DC charger (3) that includes a housing (11) having front (21) and rear (22) sides. The apertures (18) are disposed in the charger unit's housing (11). The pass-through AV cutlet (4) comprises a conventional electrical outlet receptacle (9) that is located on the front side (21) or the charger unit's housing (11) to provide continued access to 120 v AC electricity. As shown in FIG. 3, the electrical coupler (10) is disposed on the rear side (22) of the charger unit's housing (11) and comprises a conventional polarized electrical plug. The electrical coupler (10) is adapted for engagement with a power source in order to supply electricity to the charger unit (2).

In use, the charger unit (2) is connected to a power source by mounting the unit (2) onto the electrical outlet associated with the power source via the electrical coupler (10). In one preferred method of mounting the charger unit (2), the face plate of the electrical outlet is removed and the threaded fasteners (17) are extended through the apertures (18) of the charger unit (2) and threadedly engaged with the apertures conventionally disposed in the electrical outlet. Although this is one preferred method to mount the charger unit (2), other appropriate methods could be used instead.

To charge a vehicle's battery or batteries, the plug unit (50) is connected to the charger unit (2). To connect the charger unit (2) and the plug unit (50) to each other, the polarized plug (51) is inserted into the plug receptacle (5). Once connected, the magnetic connection holds the polarized plug (51) within the plug receptacle (5). With the polarized plug (51) fully connected to the plug receptacle (5), the positive (14) and negative (13) contacts of the plug receptacle (5) are fully engaged with the respective positive (54) and negative (55) electrical plug contacts of the polarized plug (51) and the first (15) and second (16) feedback loop charger contacts of the plug receptacle (5) are in full engagement with the respective first (56) and second (57) feedback loop plug contacts of the polarized plug (51).

The microprocessor controller (19) monitors the feedback between the charger circuit (20) and the plug circuit (53) and when the feedback loop plug contacts (56, 57) are recognized by the microprocessor controller (19) to be fully engaged with the feedback loop charger contacts (15, 16), electricity is allowed to flow from the charger unit (2) to the plug unit (50) and ultimately to the vehicle batteries to be charged.

When the vehicle batteries are charged, the plug unit (50) is disconnected from the charger unit (2) by withdrawing the polarized plug (51) from the plug receptacle (5). The polarized plug (51) is withdrawn by exerting enough pulling force on the plug (51) to overcome the magnetic connection between the polarized plug (51) and the plug receptacle (5). Disconnecting the plug unit (50) from the charger unit (2) results in the contact between the feedback loop charger contacts (15, 16) of the plug receptacle (5) and the feedback loop plug contacts (56, 57) of the polarized plug (51) being discontinued, whereby the flow of electricity is stopped between the charger unit (2) and the plug unit (50).

The magnetic connection allows the charger unit (2) and the plug unit (50) to be easily disconnected, thereby decreasing the wear and tear on the plug (51) and the cord (52) of the magnetic charging device (1). This magnetic connection also facilitates connecting the plug unit (50) and the charger unit (2). The flow of electricity to the plug receptacle (5) is blocked when the charger unit (2) and the plug unit (50) are not fully engaged in order to protect against electric shock due to an accidental touching of exposed positive and negative contacts (13, 14) of the plug receptacle (5).

Figure 6:
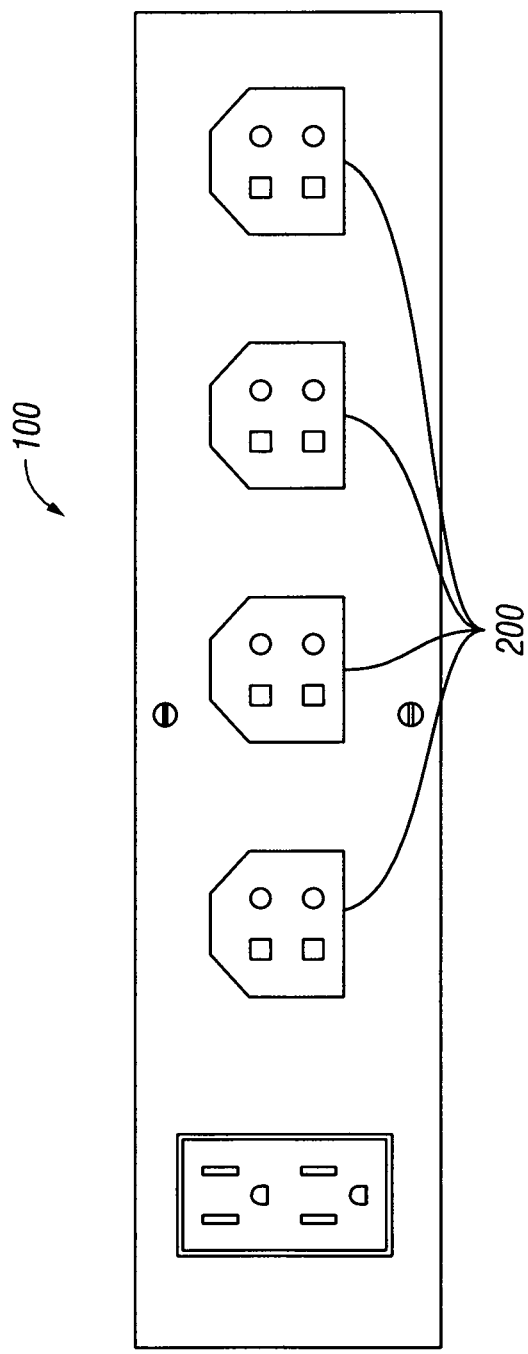
FIG. 6 is a front view of a second embodiment of the charging unit of the magnetic charging device of the present invention having a plurality of plug receptacles.

In an alternate embodiment as shown in FIG. 6, the charger unit (100) has a plurality of plug receptacles (200) for receiving multiple polarized plugs (not shown) in order to charge the batteries of more than one vehicle at a time.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A magnetic charging device for charging the batteries of an electric motorized vehicle, the magnetic charging device comprises:
    a charger unit;
    a plug unit; and
    a polarized connection between the charger unit and the plug unit;
    a magnetic connection between said charger unit and said plug unit;
    said charger unit comprises an AC/DC charger, a plug receptacle, a microprocessor controller, a pass-through AC outlet, and means for releasably attaching the charger unit to a power source having an electrical outlet;
    said plug receptacle includes positive and negative electrical charger contacts, and first and second feedback loop charger contacts;
    said microprocessor controller comprises a charger circuit, wherein said microprocessor controller controls the flow of electricity between the charger unit and the plug unit;
    said pass-through AC outlet comprises an outlet receptacle, wherein said pass-through AC outlet provides user access to the power source;
    said plug unit, comprises a polarized plug and a cord;
    said polarized plug includes a plug circuit, a positive electrical plug contact, a negative electrical plug contact, a first feedback loop plug contact, and a second feedback loop plug contact;
    wherein said polarized plug comprises a magnetized material; said plug receptacle comprises a magnetic material; said magnetized material of said polarized plug and the magnetic material of said plug receptacle create a magnetic connection between the plug receptacle and the polarized plug;
    wherein said magnetic connection holds said polarized plug in contact with said plug receptacle when the batteries of the motorized device are charging;
    wherein said AC/DC charger of the charger unit connects to an electrical power source and charges the batteries by converting alternating current (AC) from the electrical power source to direct current (DC);
    said polarized connection comprises a fitting between the polarized plug of the plug unit and the plug receptacle of the charger unit, wherein said polarized connection allows said polarized plug to fit with the plug receptacle in only one orientation to thereby deter a reverse polarity connection being made between the plug unit and the charger unit;
    wherein the microprocessor controller recognizes the fully engaged contact between the plug unit and the charger unit;
    wherein, when the plug unit is fully engaged with the charger unit, the polarized plug is engaged with said plug receptacle, the first and second feedback loop plug contacts are fully engaged with the respective first and second feedback loop charger contacts, and said positive and negative electrical plug contacts are respectively fully engaged with said positive and negative electrical charger contacts; and a feedback loop is created between said plug circuit on the plug unit and the charger circuit on the microprocessor controller;
    wherein the feedback loop produces a value of a measurable characteristic that is monitored by the microprocessor controller;
    wherein, when said microprocessor controller recognizes and confirms the value of the measurable characteristic from the feedback loop to be of a required value, said microprocessor controller allows electricity to flow from the power source to the electrical charger contacts of the plug receptacle and to the plug unit to charge the batteries;
    wherein, when the value of the measurable characteristic from the feedback loop does not meet the required value, the microprocessor controller blocks the flow of electricity from the power source to the electrical charger contacts of the plug receptacle.

2. The magnetic charging device of claim 1, wherein said measurable characteristic comprises electric flow between the charger circuit and the plug circuit.

3. The magnetic charging device of claim 1, wherein said measurable characteristic comprises electrical resistance between the charger circuit and the plug circuit.

4. A magnetic charging device for charging the batteries of an electric motorized device, the magnetic charging device comprises:
   a charger unit; and
   a plug unit;
   wherein said charger unit connects to an electrical power source;
   wherein said plug unit releasably connects to said charger unit during charging;
   said charger unit comprises a microprocessor controller;
   wherein said microprocessor controller controls the flow of electricity from the charger unit to the plug unit;
   wherein, when said plug unit is fully engaged with said charger unit, the microprocessor controller allows the flow of electricity from the charger unit to the plug unit to charge the batteries; and when said plug unit is not fully engaged with the charger unit, the flow of electricity from the power source to the charger unit is blocked, thereby preventing the flow of electricity to the plug unit;
   wherein said microprocessor controller comprises a charger circuit and said plug unit comprises a plug circuit;
   wherein, when said plug unit is fully engaged with said charger unit, a feedback loop is created between the charger circuit and the plug circuit;
   wherein said feedback loop produces a value of a measurable characteristic of electrical flow between the plug unit and the charger unit, and said value is sent to the microprocessor controller; and
   wherein said microprocessor controller recognizes and confirms the value of the measurable characteristic of electrical flow to be of a required value and allows the flow of electricity from the power source through the magnetic charging device to charge the batteries.

5. A magnetic charging device for charging the batteries of an electric motorized device, the magnetic charging device comprises:
   a charger unit; and
   a plug unit;
   wherein said charger unit connects to an electrical power source;
   wherein said plug unit releasably connects to said charger unit during charging;
   said charger unit comprises a microprocessor controller;
   wherein said microprocessor controller controls the flow of electricity from the charger unit to the plug a lit;
   wherein, when said plug unit is fully engaged with said charger unit, the microprocessor controller allows the flow of electricity from the charger unit to the plug unit to charge the batteries; and when said plug unit is not fully engaged with the charger unit, the flow of electricity from the power source to the charger unit is blocked, thereby preventing the flow of electricity to the plug unit;
   wherein said charger unit comprises a plug receptacle, and said plug unit comprises a polarized plug; wherein said polarized plug is connected to said plug receptacle during charging; and
   wherein said plug receptacle comprises positive and negative electrical charger contacts and first and second feedback loop charger contacts;
   said polarized plug comprises positive and negative electrical plug contacts and first and second feedback loop plug contacts;
   wherein during charging, the positive and negative electrical plug contacts of the polarized plug are fully engaged with the respective positive and negative electrical charger contacts of the plug receptacle, and the first and second feedback loop plug contacts of the polarized plug are fully engaged with the respective first and second feedback loop charger contacts of the plug receptacle.

6. The magnetic charging device of claim 5, wherein, when the positive and negative electrical plug contacts of the polarized plug are fully engaged with the respective positive and negative electrical charger contacts of the plug receptacle, and the first and second feedback loop plug contacts of the polarized plug are fully engaged with the respective first and second feedback loop charger contacts of the plug receptacle, the microprocessor controller allows the flow of electricity between the charger unit and the plug unit to charge the batteries; and when said plug unit is not fully engaged with the charger unit, the flow of electricity between the plug unit and the charger unit is blocked, thereby preventing charging of the batteries.

7. A magnetic charging device for charging the batteries of an electric motorized device, the magnetic charging device comprises:
   a charger unit; and
   a plug unit;
   wherein said charger unit connects to an electrical power source;
   wherein said plug unit releasably connects to said charger unit during charging;
   said charger unit comprises a microprocessor controller;
   wherein said microprocessor controller controls the flow of electricity from the charger unit to the plug unit;
   wherein, when said plug unit is fully engaged with said charger unit, the microprocessor controller allows the flow of electricity from the charger unit to the plug unit to charge the batteries; and when said plug unit is not fully engaged with the charger unit, the flow of electricity from the power source to the charger unit is blocked, thereby preventing the flow of electricity to the plug unit;
   wherein said microprocessor controller comprises a charger circuit and said plug unit comprises a plug circuit;
   wherein, when said plug unit is fully engaged with said charger unit, a feedback loop is created between the charger circuit and the plug circuit;
   wherein said feedback loop produces a value of a measurable characteristic of electrical resistance between the plug unit and the charger unit, and said value is sent to the microprocessor controller; and
   wherein said microprocessor controller recognizes and confirms the value of the measurable characteristic of electrical resistance to be of a required value and allows the flow of electricity from the power source through the magnetic charging device to the batteries.

\* \* \* \* \*